(12) United States Patent
Liao

(10) Patent No.: US 8,650,552 B1
(45) Date of Patent: Feb. 11, 2014

(54) METHODS AND SYSTEMS FOR SIMULATION OF ENERGY CONSUMPTION IN MOBILE OPERATING SYSTEM EMULATORS

(75) Inventor: Tawei Liao, Zollikerberg (CH)

(73) Assignee: Google Inc., Mountain View, CA (US)

( * ) Notice: Subject to any disclaimer, the term of this patent is extended or adjusted under 35 U.S.C. 154(b) by 24 days.

(21) Appl. No.: 13/537,519

(22) Filed: Jun. 29, 2012

Related U.S. Application Data

(60) Provisional application No. 61/662,971, filed on Jun. 22, 2012.

(51) Int. Cl.
  *G06F 9/44* (2006.01)
  *G06G 7/62* (2006.01)
  *G06F 1/32* (2006.01)
  *G06F 9/455* (2006.01)

(52) U.S. Cl.
  USPC ........... 717/135; 717/104; 717/105; 717/127; 703/22; 713/320

(58) Field of Classification Search
  None
  See application file for complete search history.

(56) References Cited

U.S. PATENT DOCUMENTS

| | | | |
|---|---|---|---|
| 7,549,069 B2 | 6/2009 | Ishihara et al. | |
| 7,813,910 B1* | 10/2010 | Poulin | 703/22 |
| 8,060,074 B2* | 11/2011 | Danford et al. | 455/419 |
| 8,239,840 B1* | 8/2012 | Czymontek | 717/135 |
| 2005/0034099 A1* | 2/2005 | Spooner | 717/104 |
| 2005/0171753 A1* | 8/2005 | Rosing et al. | 703/18 |
| 2007/0006162 A1* | 1/2007 | Iho | 717/127 |
| 2007/0220292 A1* | 9/2007 | Ishihara et al. | 713/320 |
| 2009/0036111 A1* | 2/2009 | Danford et al. | 455/419 |
| 2009/0171646 A1 | 7/2009 | Silbermintz et al. | |
| 2010/0186005 A1* | 7/2010 | Ike | 717/135 |
| 2010/0235159 A1 | 9/2010 | Sharma et al. | |
| 2011/0016455 A1 | 1/2011 | Perry et al. | |
| 2011/0154287 A1* | 6/2011 | Mukkamala et al. | 717/105 |
| 2012/0174059 A1* | 7/2012 | Jaladeen et al. | 717/105 |
| 2013/0174128 A1* | 7/2013 | Kansal et al. | 717/135 |

OTHER PUBLICATIONS

Matos, V., Android Environment Emulator, Cleveland State University, Jul. 20, 2009, 11 pages, [retrieved on Sep. 25, 2013], Retrieved from the Internet: <URL:http://jfod.cnam.fr/SEJA/supports/biblio/Android-Chapter02-Setup2-Emulator.pdf>.*

Cignetti, T., et al., Energy Estimation Tools for the Palm, Proceedings of the 3rd ACM international workshop on Modeling, analysis and simulation of wireless and mobile systems, 2000, pp. 96-103, [retrieved on Sep. 25, 2013], Retrieved from the Internet: <URL:http://dl.acm.org/>.*

(Continued)

*Primary Examiner* — Thuy Dao
*Assistant Examiner* — Geoffrey St Leger
(74) *Attorney, Agent, or Firm* — MH2 Technology Law Group, LLP

(57) ABSTRACT

An operating system emulator determines energy consumption by hardware components being simulated during testing of mobile applications. The operating system emulator can be configured to track and determine the energy consumption of hardware components by using predefined energy utilization specifications. As the operating system emulator executes an application, the operating system emulator can track the utilization of the hardware components by the application being tested. To determine energy consumption, the operating system emulator can utilize energy consumption specifications of the hardware components and the utilization of the hardware components by the application.

8 Claims, 8 Drawing Sheets

(56) References Cited

OTHER PUBLICATIONS

Marcu, M., et al., Energy Consumption Model for Mobile Wireless Communication, MobiWac'11, 2011, pp. 191-194, [retrieved on Sep. 25, 2013], Retrieved from the Internet: <URL:http://dl.acm.org/>.*

Genser et al., "A Hardware-Accelerated Estimation-Based Power Profiling Unit—Enabling Early Power-Aware Embedded Software Design and On-Chip Power Management", Transactions on HiPEAC, vol. 5, Issue 3, HiPEAC, http://www.hipeac.net/content/transactions-hipeac-volume-5-issue-3 (accessed Jun. 29, 2012).

* cited by examiner

METHODS AND SYSTEMS FOR SIMULATION OF ENERGY CONSUMPTION IN MOBILE OPERATING SYSTEM EMULATORS

CROSS-REFERENCE TO RELATED APPLICATIONS

This application claims priority to U.S. Provisional Patent Application Ser. No. 61/662,971 filed on Jun. 22, 2012, the disclosure of which is incorporated in its entirety by reference herein.

TECHNICAL FIELD

This disclosure relates generally to application testing in mobile computing devices.

BACKGROUND

Mobile device emulators allow software developers to run and test their mobile applications without a physical mobile device. The emulators run on any general purpose computer and simulate the operating system and the hardware components that are included in a mobile device, such as mobile processors, liquid crystal display, flash storage, cellular modem, etc.

For mobile devices, it is critical that applications consume as little power as possible in order to stretch battery life of the mobile devices. Currently, there exists no easy way to find out the amount of energy consumed by mobile device hardware components when testing mobile applications with the emulators. The emulators can simulate a battery usage widget of the mobile operating system, but the battery usage widget only displays the power usage of applications as a percentage of all the current running applications and hardware, including the emulated mobile operating system. This energy consumption data provides limited information on energy consumed by the application under test. It cannot help a developer optimize the code so that an application uses as little power as possible.

Presently, the only way to accurately measure energy utilization of an application is to run the application on specialized testing hardware: a mobile device outfitted with physical probes that measure the energy consumption of individual hardware components as the application runs on specialized testing hardware. Because of the wide variety of mobile devices and device makers, the specific hardware included in mobile devices can vary widely. As such, multiple testing hardware configurations must be utilized in order to cover the wide variety of mobile devices. This method, however, is not a practical solution for software developers, especially smaller developers that may not have the resources to acquire specialized testing hardware. Thus, there is a need for emulators that accurately and reliably simulate energy consumption in mobile devices.

SUMMARY

Implementations of the present teachings relate to a method for testing an application for a mobile computing device. The method includes initiating an emulator configured to simulate operation of an operating system on the mobile computing device. The method also includes accessing a device profile for the mobile computing device. The device profile specifies one or more hardware components of the mobile computing device that are simulated by the emulator. The method includes accessing a set of energy utilization specifications for the one or more hardware components. Each energy utilization specification in the set of energy utilization specifications specifies energy consumption of one of the one or more hardware components during operations of the one of the one or more hardware components. Additionally, the method includes executing, by one or more processors, one or more applications on the emulator. In the method, executing the one or more applications includes tracking, during execution of the one or more applications, a utilization by the one or more applications of each of the one or more hardware components and determining, for each of the one or more hardware components, a simulated amount of energy consumed during the execution of the one or more applications based on the utilization tracked during execution and based on the set of energy utilization specifications. Further, the method includes outputting a usage of energy by the one or more applications during their execution based on the simulated amount of energy consumed by the one or more hardware components.

Implementations of the present teachings also relate to a computer readable storage medium comprising instructions for causing one or more processors to perform a method for testing an application for a mobile computing device. The method includes initiating an emulator configured to simulate operation of an operating system on the mobile computing device. The method also includes accessing a device profile for the mobile computing device. The device profile specifies one or more hardware components of the mobile computing device that are simulated by the emulator. The method includes accessing a set of energy utilization specifications for the one or more hardware components. Each energy utilization specification in the set of energy utilization specifications specifies energy consumption of one of the one or more hardware components during operations of the one of the one or more hardware components. Additionally, the method includes executing one or more applications on the emulator. In the method, executing the one or more applications includes tracking, during execution of the one or more applications, a utilization by the one or more applications of each of the one or more hardware components and determining, for each of the one or more hardware components, a simulated amount of energy consumed during the execution of the one or more applications based on the utilization tracked during execution and based on the set of energy utilization specifications. Further, the method includes outputting a usage of energy by the one or more applications during their execution based on the simulated amount of energy consumed by the one or more hardware components.

Implementations of the present teachings also relate to a system comprising one or memory devices and one or more processors coupled to the one or more memory devices. The one or more processors are configured to execute the instructions to perform a method for testing an application for a mobile computing device. The method includes initiating an emulator configured to simulate operation of an operating system on the mobile computing device. The method also includes accessing a device profile for the mobile computing device. The device profile specifies one or more hardware components of the mobile computing device that are simulated by the emulator. The method includes accessing a set of energy utilization specifications for the one or more hardware components. Each energy utilization specification in the set of energy utilization specifications specifies energy consumption of one of the one or more hardware components during operations of the one of the one or more hardware components. Additionally, the method includes executing one or more applications on the emulator. In the method, executing the one or more applications includes tracking, during execution of the one or more applications, a utilization by the one or more applications of each of the one or more hardware components and determining, for each of the one or more hardware components, a simulated amount of energy consumed during the execution of the one or more applications based on the utilization tracked during execution and based on the set of energy utilization specifications. Further, the method includes outputting a usage of energy by the one or more applications during their execution based on the simulated amount of energy consumed by the one or more hardware components.

BRIEF DESCRIPTION OF THE DRAWINGS

Various features of the implementations can be more fully appreciated, as the same become better understood with reference to the following detailed description of the implementations when considered in connection with the accompanying figures, in which.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Electrical, mechanical, logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Implementations of the present disclosure are directed to an operating system emulator that determines energy consumption by hardware components being simulated during testing of mobile applications. According to some implementations, the operating system emulator can be configured to track and determine the energy consumption of hardware components by using predefined energy utilization specifications. As the operating system emulator executes an application, the emulator can track the utilization of the hardware components by the application being tested. To determine energy consumption, the operating system emulator can utilize energy consumption specifications of the hardware components and the utilization of the hardware components by the application.

Figure 1:
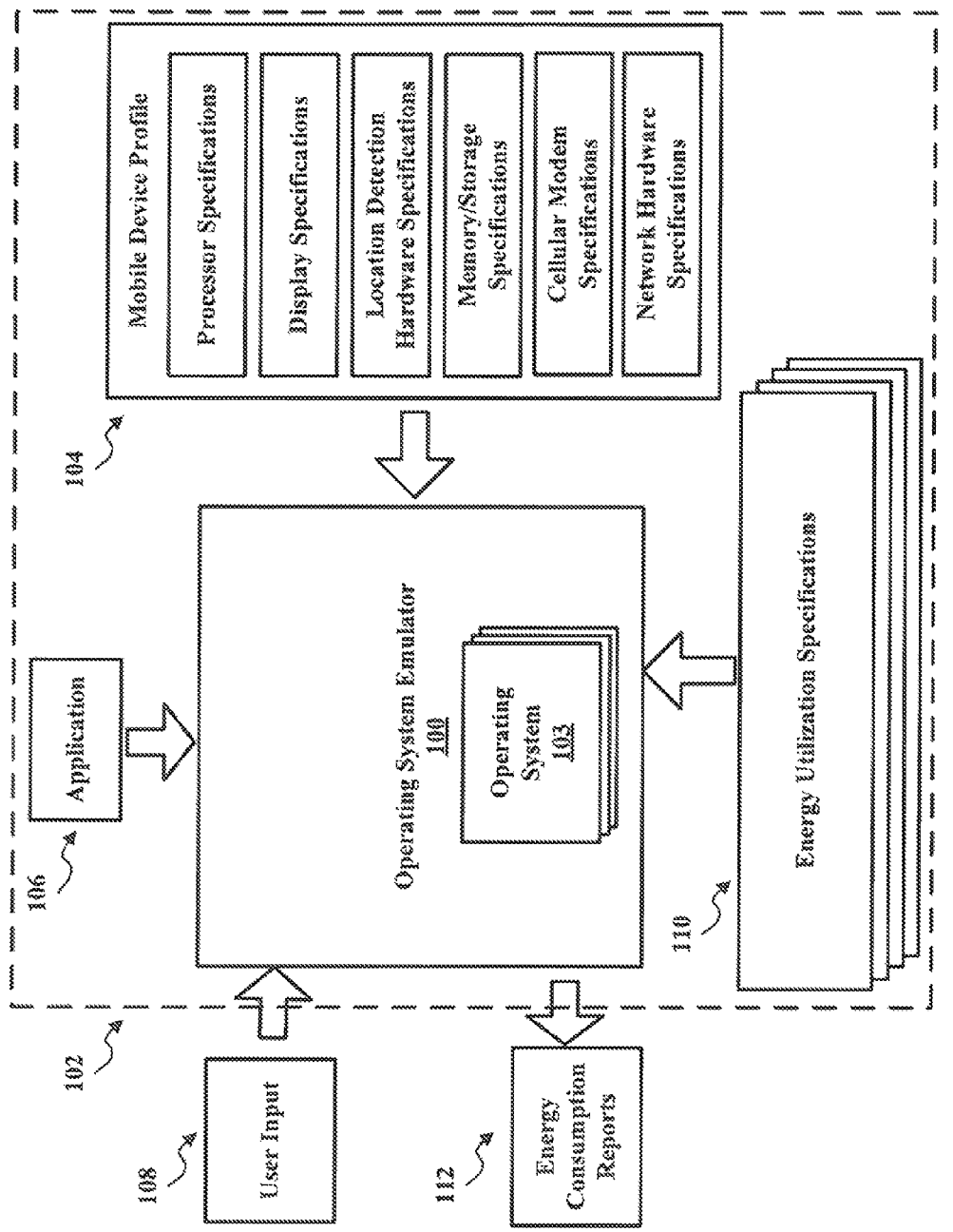
FIG. 1 is a generic block diagram that illustrates an example operating system emulator and related components, according to various implementations.

FIG. 1 illustrates an operating system (OS) emulator 100 that can be configured to track and determine energy consumption during testing of an application, according to various implementations. While FIG. 1 illustrates various components contained in and related to the OS emulator 100, FIG. 1 is one example of an OS emulator and additional components can be added and existing components can be removed.

The OS emulator 100 can be configured to execute on a computing system 102 and configured to simulate the operation and execution of one or more operating systems 103 on different types mobile computing device. While executing on the computing device 102, the OS emulator 100 simulates the functions and processes of one of the operating systems 103 as if the operating system 103 was executing on a mobile computing device. As such, the OS emulator 100 can provide a testing environment, in the computing system 102, that emulates the operating system 103 as it would execute on a real mobile computing device. To achieve this, the OS emulator 100 can include instructions, routines, algorithms, and the like to simulate the operation, functions, and processes of the one or more operating systems 103 on different mobile computing devices.

The OS emulator 100 can be configured to emulate the operation and execution of various types of operating systems for mobile computing devices. The one or more operating systems 103, emulated by the OS emulator 100, can include any type of known open-source or known proprietary operating system for mobile computing devices. Likewise, the OS emulator 100 can be configured to emulate any type of mobile computing device. For example, the OS emulator 102 can be configured to simulate the operation of mobile computing devices such as a smartphones, a tablet computing devices, personal digital assistants, and the like.

During operation, the OS emulator 100 can be configured to allow a user of the OS emulator 100 to select and configure the one or more operating systems 103 emulated by the OS emulator 100. The OS emulator 100 can include the necessary instructions, routines, algorithms, and the like that generate interfaces and allow communication via the interfaces so that the user can select and configure the one or more operating systems 103. For example, the OS emulator 100 can generate command-line and/or graphical user interfaces (GUIs) to allow the user to interact with the OS emulator 100. Likewise, the OS emulator 100 can be configured to automatically emulate the one or more operating systems 103 without user configuration.

To simulate a particular mobile computing device, the OS emulator 100 can be configured to access a mobile device profile 104. The mobile device profile 104 can identify the mobile computing device that is represented by the mobile device profile 104, for example, by manufacturer and model. Additionally, the mobile device profile 104 can specify the hardware components that are contained in the mobile computing device to be emulated by the OS emulator 100. The mobile device profile 104 can include an identification of the hardware components contained in the mobile computing device, for example, by manufacturer name and model. Also, the mobile device profile 104 can include the specifications of the hardware components. For example, as illustrated, an example of the mobile device profile 104 can include the specifications of a processor, a display device, location detection hardware, memory hardware, storage hardware, cellular communication hardware, and network communication hardware.

Likewise, the OS emulator 100 can be configured to allow a user to create a custom mobile device profile. For example, the OS emulator 100 can allow the user to select different hardware components to be included in the mobile computing device. To create a custom mobile device profile, the user can communicate with the OS emulator 100 via command-line and/or GUIs as described above. After creation, the OS emulator 100 can be configured to maintain a record of the mobile device profile created by the user.

The OS emulator 100 can be configured to simulate the operation of the one or more operating systems 103 on a mobile computing device in order to test an application. For example, a user of the OS emulator 100 may desire to test an application 106. The user may desire to test the application 106 in order to determine whether the application 106 functions and operates, as designed, on the one or more operating systems 103 executing on the mobile computing device. The OS emulator 100 can be configured to load the application 106 and simulate the operation of the one or more operating systems 103 on the mobile computing device.

During execution of the application 106, the hardware components of a mobile computing device consume energy over time. The amount of energy consumed by the hardware components can depend on the utilization of the hardware components by the application 106. In particular, as the application 106 executes, the functions and operations of the application 106 can cause the hardware components to enter different operating states. For example, as the application loads instructions and stores data, the processor and memory enter different operating states as the application 106 accesses these hardware components. The functions and operations of the application 106, which cause the different operating states, can be automatically performed by the application 106. For instance, as the application 106 loads and executes, the application 106 can automatically load data into memory. The functions and operations of the application 106, which cause the different operating states, can be in response to user input 108 with the application 106. For instance, the user can request that the application 106 transmit data and, in response, the network and/or cellular hardware can power-up to transmit the data.

Figure 2A:
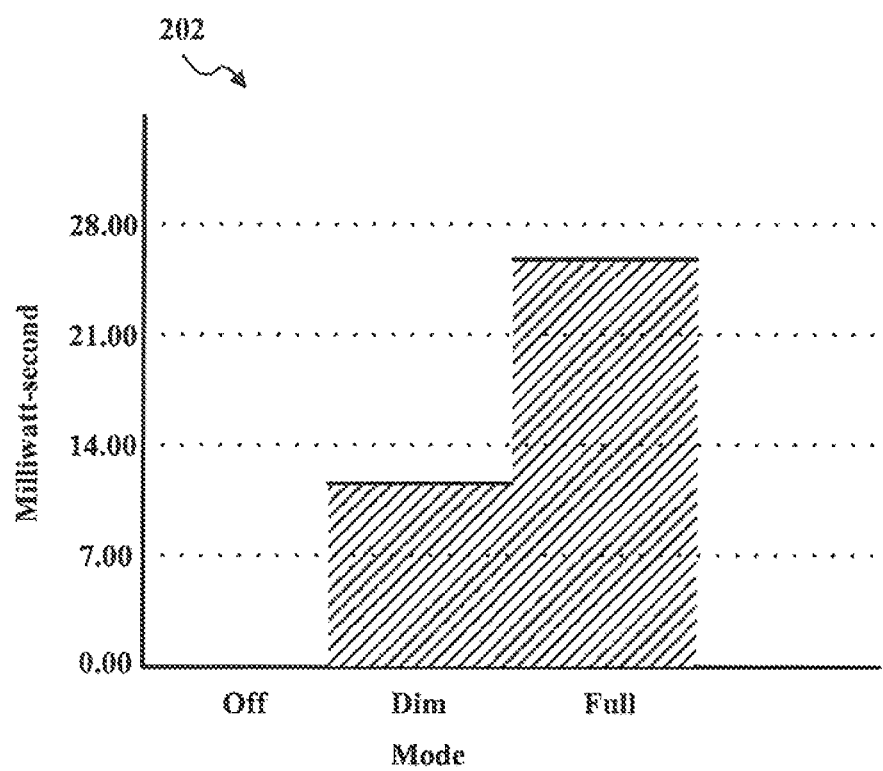
FIGS. 2A and 2B are graphs that illustrate energy consumption as a function of operating state for examples of hardware components of a mobile computing device, according to various implementations.

A hardware component of the mobile computing device consumes energy based on the operating state of that hardware component. For example, a display device, such as a LCD display, contained in a mobile computing device, can consume energy depending on the brightness of the display. FIG. 2A illustrates a graph 202 that shows an example of energy consumption of an LCD display as a function of operating state, according to implementations. In this example, the LCD display can have three operating states: "Off," "Dim," and "Full." The three operating states represent the brightness of the LCD display. The LCD display consumes more energy as the LCD display increases brightness. As illustrated in FIG. 2A, the LCD display consumes little or no energy, approximately 0.00 milliwatt second, during the "Off" operating state. During the "Dim" operating state, the LCD display operates at a reduced brightness and consumes an intermediate amount of energy, for example, approximately 12.00 milliwatt second. During the "Full" operating state, the LCD display operates at full brightness and consumes a maximum amount of energy over time, for example, approximately 26.00 milliwatt second.

Figure 2B:
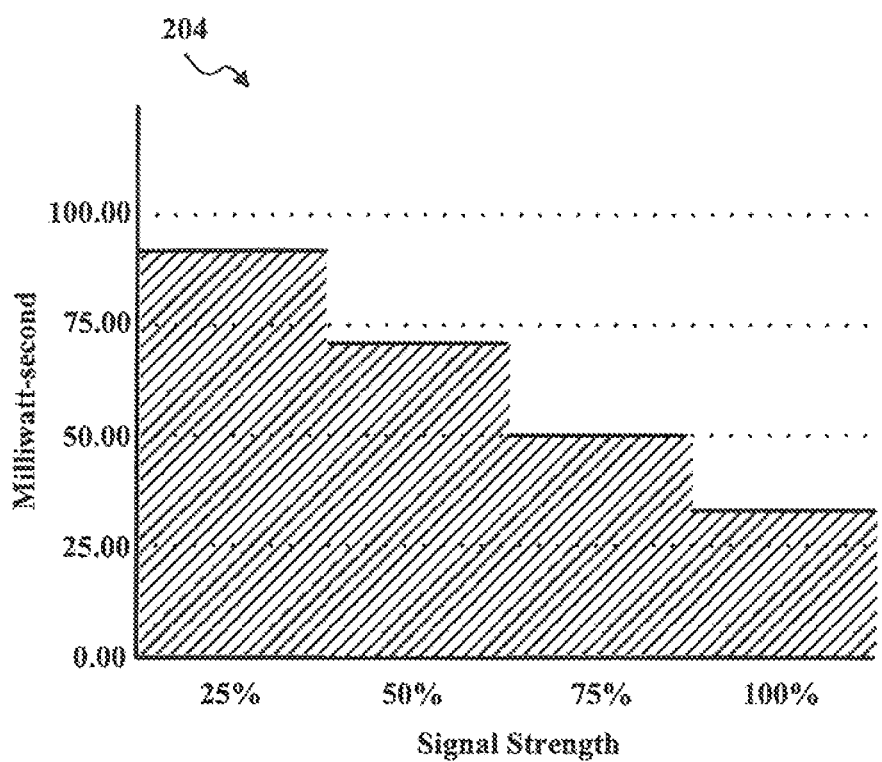

Additionally, for example, a cellular modem contained in a mobile device, can consume energy depending on signal strength of a communication signal from a cellular tower. FIG. 2B illustrates a graph 204 that shows an example of energy consumption of a cellular modem as a function of signal strength, according to implementations. In this example, the cellular modem can have four operating states: "25.00%," "50.00%," "75.00%" and "100.00%." Each operating state represents signal strength as a percentage of largest possible communications signal received by the cellular modem. As the signal strength decreases, the cellular modem consumes more energy due to the cellular modem increasing energy to the transmitter and receiver in order to exchange data with the cellular tower. For example, as illustrated in FIG. 2B, the cellular modem consumes approximately 95.00 milliwatt second, during the "25.00%" operating state. During the "50.00%" operating state, the cellular modem consumes approximately 70.00 milliwatt second. During the "75.00%" operating state, the cellular modem consumes approximately 50.00 milliwatt second. During the "100.00%" operating state, the cellular modem consumes approximately 35.00 milliwatt second.

While the above examples illustrate energy consumption for two hardware components typically found in a mobile computing device, any hardware component contained in a mobile computing device can exhibit similar energy consumption based on the particular operating states of the hardware component. Likewise, while the two examples above illustrate several operating states and examples of energy consumption for those operating states, any hardware component can exhibit fewer or greater operating states with different energy consumption values depending on the type of hardware component and/or the particular manufacturer and configuration of each different type of hardware component.

In implementations, the OS emulator 100 can be configured to simulate the energy utilization and consumption, by the hardware components of the mobile computing device, during the test of the application 106. In particular, as the application 106 executes, the OS emulator 100 can be configured to track and record the operating state of each of the hardware components and amount of time each hardware component operates at the operating state. As the operating states of a hardware component changes, the OS emulator 100 can be configured to track and record the new operating state and the amount of time the hardware component operates in the new operating state.

In implementations, the OS emulator 100 can be configured to determine the energy consumption by each of the hardware components during execution of the application 106. To achieve this, the OS emulator 100 can be configured to access a set of energy utilization specifications 110. Each of the energy utilization specifications 110 can store the operating states of a particular hardware component and the energy utilization corresponding to each operating state.

Figure 3A:
FIGS. 3A and 3B are diagrams that illustrate examples of energy utilization specifications for examples of hardware components, according to various implementations.
Figure 3B:

FIGS. 3A and 3B illustrate two examples of the energy utilization specifications 110 according to various implementations. As illustrated in FIG. 3A, an energy utilization specification 302 can store the energy utilization at different operating states for an example of an LCD display, for instance, model "XYZ." In this example, the LCD display can have three operating states: "Off," "Dim," and "Full." The three operating states represent the brightness of the LCD display. The LCD display consumes more energy as the LCD display increases brightness. The LCD display consumes little or no energy, approximately 0.00 milliwatt second, during the "Off" operating state. During the "Dim" operating state, the LCD display operates at a reduced brightness and consumes an intermediate amount of energy, for example, approximately 12.00 milliwatt second. During the "Full" operating state, the LCD display operates at full brightness and consumes a maximum amount of energy over time, for example, approximately 26.00 milliwatt second.

As illustrated in FIG. 3B, an energy utilization specification 304 can store the energy utilization at different operating states for a cellular modem, for instance, model "ABC." In this example, the cellular modem can have four operating states: "25.00%," "50.00%," "75.00%" and "100.00%." Each operating state represents signal strength as a percentage of largest possible communications signal received by the cellular modem. As the signal strength decreases, the cellular modem consumes more energy due to the cellular modem increasing energy to the transmitter and receiver in order to exchange data with the cellular tower. For example, the cellular modem consumes approximately 95.00 milliwatt second, during the "25.00%" operating state. During the "50.00%" operating state, the cellular modem consumes approximately 70.00 milliwatt second. During the "75.00%" operating state, the cellular modem consumes approximately 50.00 milliwatt second. During the "100.00%" operating state, the cellular modem consumes approximately 35.00 milliwatt second.

In implementations, the OS emulator 100 can be configured to maintain and store the set of energy utilization specifications 110 on the computing system 102. Likewise, the OS emulator 100 can be configured to retrieve the set of energy utilization specifications 110 from a remote computing system. The one or more of the energy utilization specifications in set of energy utilization specifications 110 can be generated by manufacturers of different hardware components. Likewise, one or more of the energy utilization specifications in set of energy utilization specifications 110 can be generated by a user of the OS emulator 100 by testing the energy utilization of hardware components.

While the above examples illustrate energy utilization specifications for two hardware components typically found in a mobile computing device, any hardware component contained in a mobile computing device can exhibit similar energy consumption based on the particular operating states of the hardware component and can be included in the set of energy utilization specifications. Likewise, while the two examples above illustrate several operating states and examples of energy consumption for those operating states, any hardware component can exhibit fewer or greater operating states with different energy consumption values depending on the type of hardware component and/or the particular manufacturer and configuration of each different type of hardware component.

In implementations, the OS emulator 100 can be configured to utilize the set of energy utilization specifications 110 to determine the energy consumed by each hardware component during the test of the application 106. The OS emulator 100 can be configured to retrieve one or more of the set of energy utilization specifications 110 that correspond to the hardware components specified in the mobile device profile 104. The OS emulator 100 can be configured to calculate the energy consumption based on the operating state and amount of time operating in the operating state and based on the set of energy utilization specifications 110. In particular, for a particular hardware component operating at a particular operating state, the OS emulator 100 can be configured to search the set of energy utilization specifications 110 and retrieve the energy utilization corresponding to the particular operating state. The retrieved energy utilization can represent the current energy consumption by the particular hardware component at a particular time.

To calculate overall energy consumption of a particular hardware component, the OS emulator 100 can be configured to search the set of energy utilization specifications 110 and retrieve the energy utilization corresponding to each operating state recorded for the hardware component. The OS emulator 100 can be configured to multiply the amount of time spent operating in each corresponding operating state to calculate the overall energy consumption in each operating state. The OS emulator 100 can be configured to sum the overall energy consumption for each operating state to calculate the overall energy consumption for the hardware component. The OS emulator 100 can be configured to calculate the energy consumption for each of the hardware components in the mobile device profile 104.

Once calculated, the OS emulator 100 can be configured to output the energy consumption for the hardware components in one or more energy consumption reports 112. The OS emulator 100 can be configured to provide the reports at any time during the test of the application 106 and/or after completion of the test of the application 106. For example, the OS emulator 100 can provide the one or more energy consumption reports 112, in real-time, as the application 106 executes. Likewise, the OS emulator 100 can provide the one or more energy consumption reports 112 after the completion of the test of the application 106.

In implementations, the one or more energy consumption reports 112 can include an identification of each of the hardware components specified in the mobile device profile 104, the current operating state of each of the hardware components, the current energy consumption of each of the hardware components, the overall energy consumption for each of the hardware components, and other parameters and metrics related to the test of the application 106 and energy consumption by the hardware components. The one or more energy consumption reports 112 can include other information such as an identification of the mobile device profile 104 and the like. The OS emulator 100 can output the one or more energy consumption reports 112 in any format such as command-line and/or GUIs that can be displayed for viewing by a user of the OS emulator 100. Likewise, the OS emulator 100 can output the one or more energy consumption reports 112 in other formats such as printed reports.

In implementations, the OS emulator 100 can determine other metrics related to energy consumption by the hardware components. For example, the mobile device profile 104 and/or the set of energy utilization specifications 110 can specify a type and specifications of one or more batteries utilized by the mobile computing device specified by the mobile device profile 104. As such, the OS emulator 100 can utilize the battery specifications and the energy consumption to calculate metrics related to the battery such as expected battery life at the current energy consumption, overall battery usage during the test of the application 106, and the like. The OS emulator 100 can be configured to include the other metrics related to energy consumption by the hardware components in the one or more energy consumption reports 112.

Figure 4:
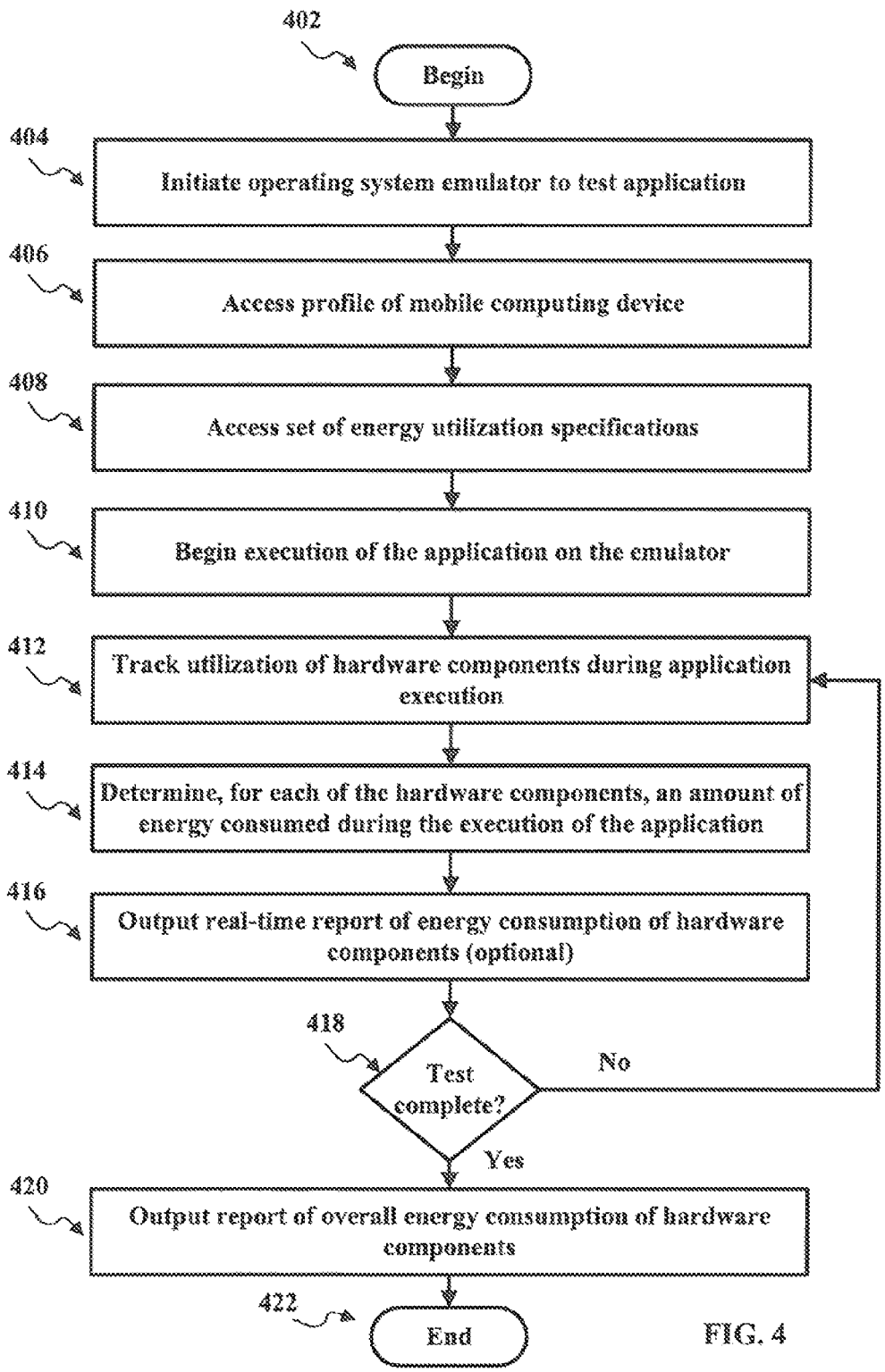
FIG. 4 is flow diagram that illustrates an example of a process performed by an operating system emulator to track and determine energy consumption, according to various implementations.

FIG. 4 illustrates an example of processes that can be performed by the OS emulator 100 to track the energy consumption of hardware components during a test of the application 106, according to various implementations. While FIG. 4 illustrates an example of a process that can be performed by the OS emulator 100, one skilled in the art will realize that any of the stages of the processes can be performed by other systems. Likewise, one skilled in the art will realize that the illustrated stages of the process are examples and that any of the illustrated stages can be removed, additional stages can be added, and the order of the illustrated stages can be changed.

In 402, the process can begin. In 404, an OS emulator can be initiated to test one or more applications on an operating system of a mobile computing device. For example, as illustrated in FIG. 1, the OS emulator 100 can be initiated on the computing system 102 to test the application 106 on one of the operating systems 103. The OS emulator 100 can be initiated by a user that desires to test the application 106. Likewise, the OS emulator 100 can automatically start a test of the application 106.

In 406, the OS emulator can access a profile of a mobile computing device. For example, as illustrated in FIG. 1, the OS emulator 100 can access the mobile device profile 104. The mobile device profile 104 can specify the particular hardware components contained the mobile computing device represented by the mobile device profile 104. The OS emulator 100 can access the mobile device profile 104 that is stored on the computing system 102. Likewise, the OS emulator 100 can remotely access the mobile device profile 104 that is stored on a remote computing system.

In 408, the OS emulator can access a set of energy utilization specifications. For example, as illustrated in FIG. 1, the OS emulator 100 can access the set of energy utilizations specifications 110 that correspond to the hardware components specified in the mobile device profile 104. In particular, the OS emulator 100 can identify, from the mobile device profile 104, the number and type of hardware components specified in the mobile device profile 104 such as processors, display devices, memory and storage devices, cellular modems, network hardware devices, location detection hardware, and the like. Once identified, the OS emulator 100 can search the set of energy utilization specifications 110 and can retrieve one or more of the energy utilization specifications from the set of energy utilization specifications 110 that match the hardware components specified in the mobile device profile 104.

In 410, the OS emulator can begin execution of the application on the OS emulator. For example, as illustrated in FIG. 1, the OS emulator 100 can begin execution of the application 106. In particular, the OS emulator 102 can examine the mobile device profile 104 and can identify the specifications for the hardware components in the mobile device profile 104. Based on the specifications, the OS emulator 100 can configure its operation and can begin execution to simulate one of the operating systems 103 running on a mobile computing device represented by the mobile device profile. The OS emulator 100 can install and begin execution of the application 106 on the emulated one of the operating systems 103.

In 412, the OS emulator can track utilization of the hardware components during execution of the application. For example, as illustrated in FIG. 1, the OS emulator 100 can track the utilization, by the application 106, of the hardware components specified in the mobile device profile 104. In particular, as the application 106 executes, the OS emulator 100 can track and record the operating state of each of the hardware components and an amount of time each of the hardware components operates in that operating state. As the operating states of a hardware component changes, the OS emulator 100 can be configured to track and record the new operating state and the amount of time the hardware component operates in the new operating state.

The functions and operations of the application 106, which cause the different operating states, can be automatically performed by the application 106. For instance, as the application 106 loads and executes, the application 106 can automatically load data into memory. The functions and operations of the application 106, which cause the different operating states, can be in response to the user input 108 with the application 106. For instance, the user can request that the application 106 transmit data and, in response, the network and/or cellular hardware can power-up to transmit the data.

In 414, the OS emulator can determine, for each of the hardware components simulated, an amount of energy consumed during the execution of the application. For example, for a particular hardware component operating at a particular operating state, the OS emulator 100 can be configured to search the set of energy utilization specifications 110 and retrieve the energy utilization specification corresponding to the particular operating state. The retrieved energy utilization can represent the current energy consumption by the particular hardware component at that particular time. To calculate overall energy consumption of a particular hardware component, the OS emulator 100 can multiply the amount of time spent operating in each corresponding operating state to calculate the overall energy consumption in each operating state. The OS emulator 100 can be configured to sum the overall energy consumption for each operating state to calculate the overall energy consumption for the hardware component. The OS emulator 100 can be configured to calculate the energy consumption for each of the hardware components in the mobile device profile 104.

In 416, as the application executes, the OS emulator can output a real-time report of the energy consumption of the hardware components. For example, as the application 106 executes, the OS emulator 100 can output the one or more energy consumption reports 112 that represent the current energy consumption of the hardware components. The energy consumption reports 112 can include an identification of each of the hardware components specified in the mobile device profile 104, the current operating state of each of the hardware components, and the current energy consumption of each of the hardware components. The energy consumption reports 112 can include other information such as an identification of the mobile device profile 104 and the like. The OS emulator 100 can output the energy consumption reports 112 in any format such as command-line and/or GUIs that can be displayed for viewing by a user of the OS emulator 100. Likewise, the OS emulator 100 can output the energy consumption reports 112 in other format such as printed reports.

Figure 5A:
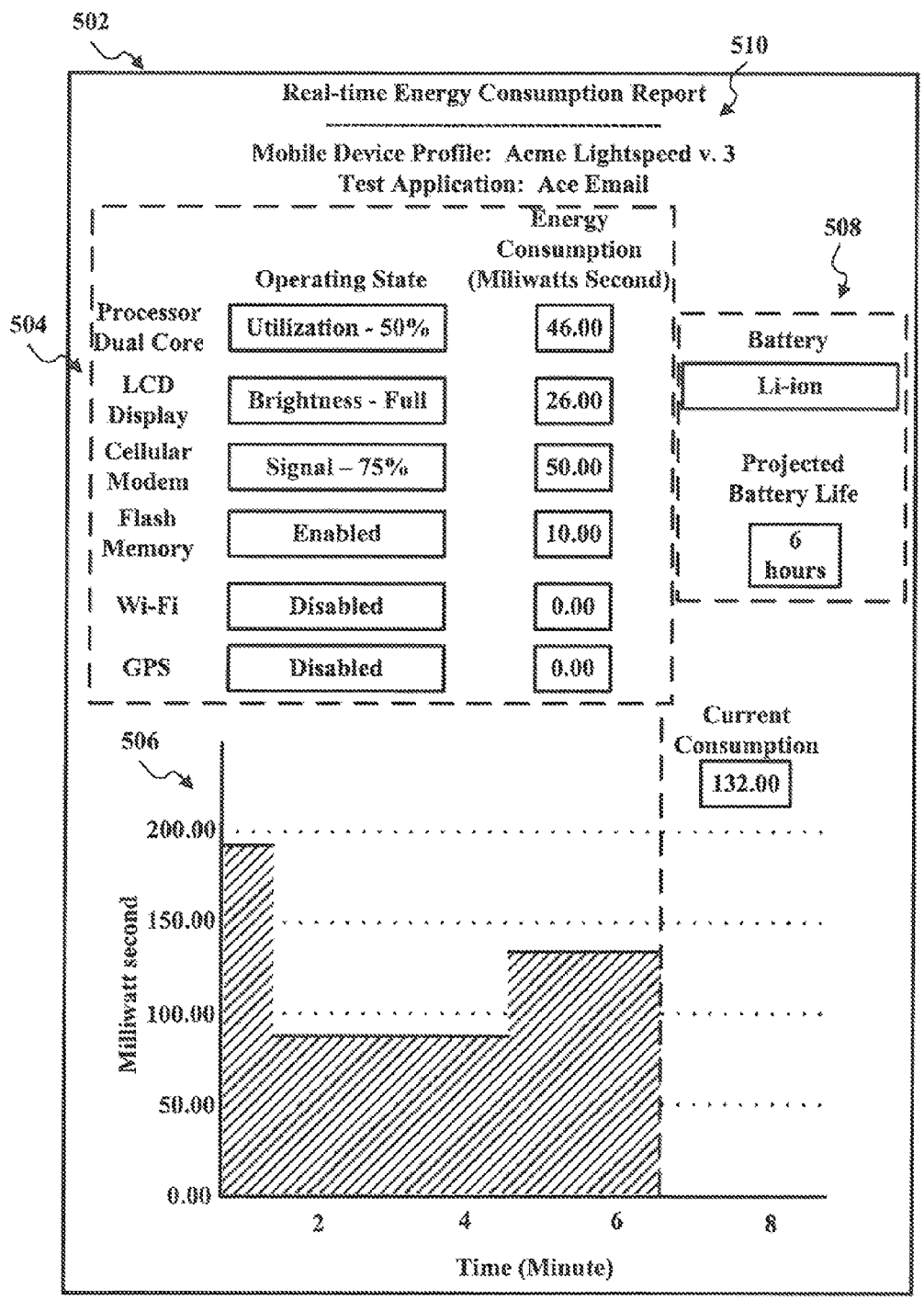
FIG. 5A is a diagram that illustrates an example of a real-time energy consumption report, according to various implementations.

FIG. 5A illustrates an example of a real-time energy consumption report 502, according to implementations. The real-time energy consumption report 502 can include various widgets and fields that display the current energy consumption by the hardware components. As illustrated, the real-time energy consumption report 502 can include widgets 504. The widgets 504 can display an identification of the hardware components, the current operating state of the hardware components, and the current energy consumption of the hardware components. The energy consumption displayed in the widgets 504 can correspond to the energy utilization retrieved from the set of energy utilization specification 110 corresponding to the current operating state. As illustrated, the real-time energy consumption report 502 can include a graph 506 that displays the total energy consumption over the execution time of the application 106. The graph 506 represents a history of overall energy consumption of all the hardware components at different times the application 106 was executing. The OS emulator 100 can calculate the overall energy consumption at a particular time by summing the energy consumption of each hardware component at that particular time.

The real-time energy consumption report 502 can include other widgets 508 that display other information regarding energy consumption. For example, the widgets 508 can display information about the battery of the mobile computing device being simulated and battery usage relative to energy consumption. In particular, the mobile device profile 104 and/or the set of energy utilization specifications 110 can specify the type and specification of a battery utilized by the mobile computing device. As such, the OS emulator 100 can utilize the battery specification and the energy consumption to calculate metrics related to the battery such as expected battery life at the current energy consumption. The real-time energy consumption report 502 can include other information 510 such as an identification mobile device specified in the mobile device profile 104 and an identification of the application 106 under test.

Returning to the process of FIG. 4, in 418, the OS emulator can continue to track and determine the energy consumption during the execution of the application. As the operating states of a hardware component changes, the OS emulator 100 can be configured to track and record the new operating state and the amount of time the hardware component operates in the new operating state. Once the test is complete, the OS emulator 100 can stop execution of the application 106.

In 420, once the application test is complete, the OS emulator can output a report of the overall energy consumption of the hardware components. For example, after completion of the test of the application 106, the OS emulator 100 can output the one or more energy consumption reports 112 that represent the overall energy consumption of the hardware components. The energy consumption reports 112 can include an identification of each of the hardware components specified in the mobile device profile 104 and the overall energy consumption of each of the hardware components. The energy consumption reports 112 can include other information such as an identification of the mobile device profile 104 and the like. The OS emulator 100 can output the energy consumption reports 112 in any format such as command-line and/or GUIs that can be displayed for viewing by a user of the OS emulator 100. Likewise, the OS emulator 100 can output the energy consumption reports 112 in other formats such as printed reports.

Figure 5B:
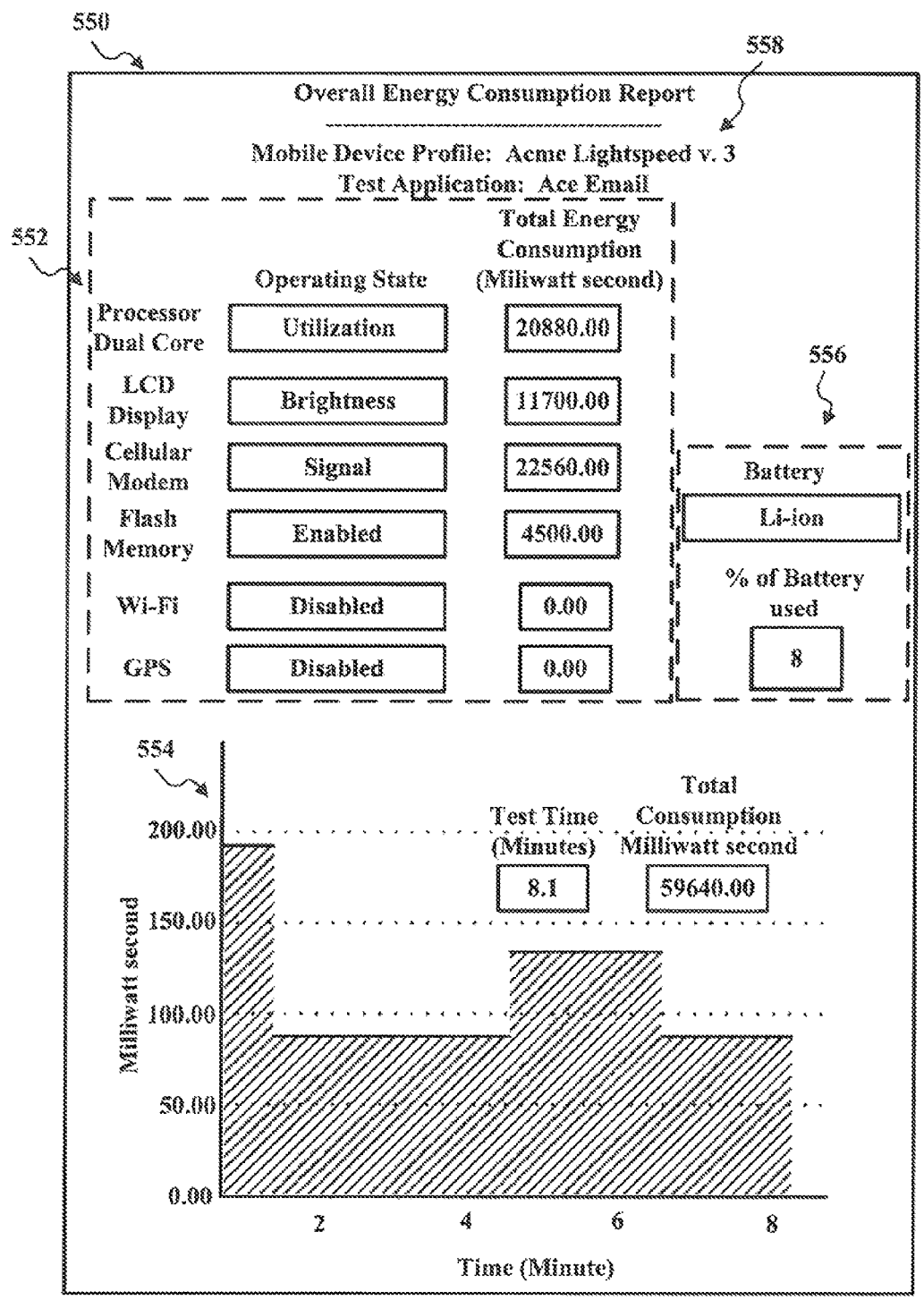
FIG. 5B is a diagram that illustrates an example of an overall energy consumption report, according to various implementations.

FIG. 5B illustrates an example of the overall energy consumption report 550, according to various implementations. The overall energy consumption report 550 can include various widgets and fields that display the overall energy consumption by the hardware components. As illustrated, the overall energy consumption report 550 can include widgets 552. The widgets 552 can display an identification of the hardware components, an explanation of the operating states, and the overall energy consumption of the hardware components during the test of the application 106. The energy consumption displayed in the widgets 552 can correspond to the overall energy utilization calculated for each hardware component. As illustrated, the overall energy consumption report 550 can include a graph 554 that displays the overall energy consumption over the execution time of the application 106. The graph 554 represents a history of overall energy consumption of all the hardware components at different times the application 106 was executing. The OS emulator 100 can calculate the overall energy consumption at a particular time by summing the energy consumption of each hardware component at that particular time.

The overall energy consumption report 550 can include other widgets 556 that display other information regarding energy consumption. For example, the widgets 556 can display information about the battery of the mobile computing device being simulated and battery usage relative to energy consumption. In particular, the mobile device profile 104 and/or the set of energy utilization specifications 110 can specify the type and specification of a battery utilized by the mobile computing device. As such, the OS emulator 100 can utilize the battery specification and the energy consumption to calculate metrics related to the battery such as percentage of the battery life consumed by the overall energy consumption. The overall energy consumption report 550 can include other information 558 such as an identification mobile device specified in the mobile device profile 104 and an identification of the application 106 under test.

In 422, the process can end, return to any point or repeat.

While the above examples were described with reference to energy consumption, e.g. milliwatt second, the OS emulator 100 can track and determine the energy consumption for any metric that describes the energy consumption of the hardware components of a mobile computing device, for example, current, joules, and the like. As such, the set of energy utilization specifications 110 can include the energy utilization in terms of the relevant energy measurement.

Additionally, while FIGS. 5A and 5B illustrate two examples of the one or more energy consumption reports 112, the one or more energy consumption reports 112 can include any information relevant to the test of the application 106 and the information can be arranged in any configuration. For example, the widgets and fields of the one or more energy consumption reports 112 can include links to information and data about the hardware components and the mobile device profile 104.

Figure 6:
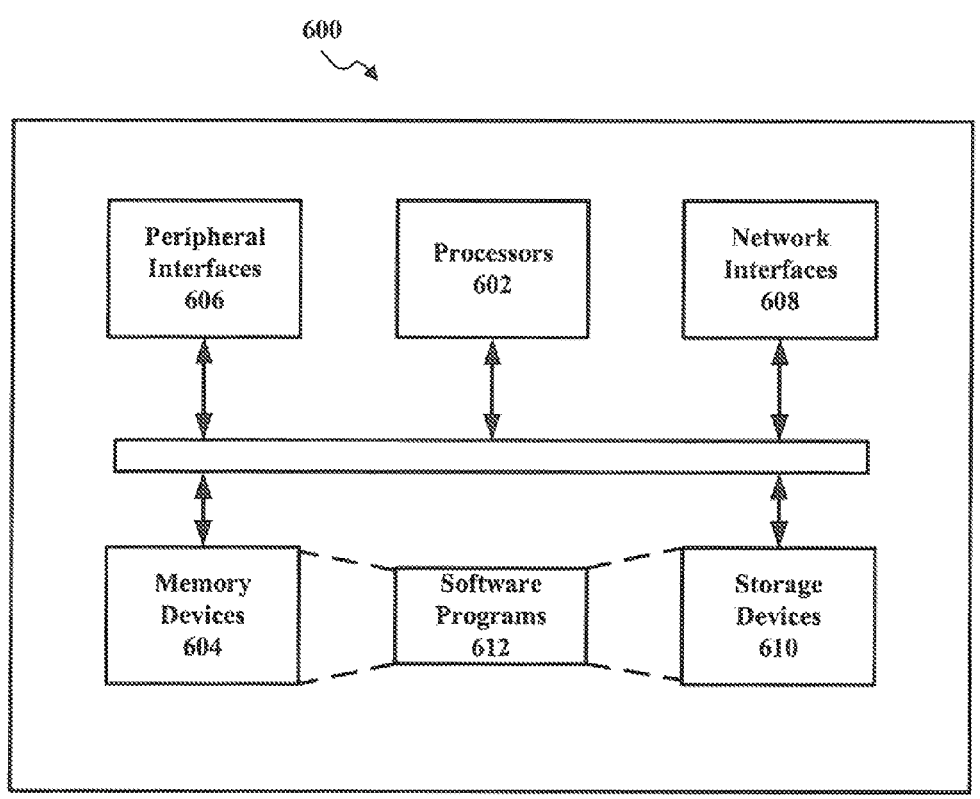
FIG. 6 is a generic block diagram that illustrates an example of a computing system that can run the operating system emulator, according to various implementations.

FIG. 6 is a diagram depicting an example of a hardware configuration for a computing device 600, such as the computing system 102, that execute the OS emulator 100 and can be used to perform one or more of the processes described above. While FIG. 6 illustrates various components contained in the computing device 600, FIG. 6 illustrates one example of a computing device and that additional components can be added and existing components can be removed.

As illustrated in FIG. 6, the computing device 600 can include one or more processors 602 of varying core configurations and clock frequencies. The computing device 600 can also include one or more memory devices 604 that serve as a main memory during the operation of the computing device 600. The computing device 600 can also include one or more peripheral interfaces 606, such as keyboards, mice, touchpads, computer screens, touchscreens, etc., for enabling human interaction with and manipulation of the computing device 600.

The computing device 600 can also include one or more network interfaces 608 for communicating via one or more networks, such as Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc. The computing device 600 can also include one or more storage device 610 of varying physical dimensions and storage capacities, such as flash drives, hard drives, random access memory, etc., for storing data, such as images, files, and program instructions for execution by the one or more processors 602.

Additionally, the computing device 600 can include one or more software programs 612, such as the OS emulator 100 and the application 106. The one or more software programs 612 can include instructions that cause the one or more processors 602 to perform the processes described. The one or more software programs 612 can be stored in the one or more memory devices 604 and/or on in the one or more storage devices 610. Likewise, the data, for example, the mobile device profile 104 and the set of energy utilization specification 110, utilized by one or more software programs 612 can be stored in the one or more memory devices 604 and/or on in the one or more storage devices 610

In embodiments, the components of the computing device 600 need not be enclosed within a single enclosure or even located in close proximity to one another. Those skilled in the art will appreciate that the above-described componentry are examples only, as the computing device 600 can include any type of hardware componentry, including any necessary accompanying firmware or software, for performing the disclosed embodiments. The computing device 600 can also be implemented in part or in whole by electronic circuit components or processors, such as application-specific integrated circuits (ASICs) or field-programmable gate arrays (FPGAs).

Certain implementations described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Examples of computer readable storage devices and media include conventional computer system RAM (random access memory), ROM (read-only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Those skilled in the art will recognize that these and other variations are possible within the spirit and scope as defined in the following claims and their equivalents.

What is claimed is:

1. A method for testing an application for a mobile computing device, the method comprising:
   initiating an emulator configured to simulate operation of an operating system on the mobile computing device;
   accessing a device profile for the mobile computing device, wherein the device profile specifies one or more hardware components of the mobile computing device that are simulated by the emulator, wherein the one or more hardware components specified in the device profile are received from a user of the emulator;
   accessing a set of energy utilization specifications for the one or more hardware components, wherein each energy utilization specification in the set of energy utilization specifications specifies one or more operating states of one of the one or more hardware components, and an energy consumption of the one of the one or more hardware components per time unit for each of the one or more operating states of the one of the one or more hardware components during operations of the one of the one or more hardware components;
   executing, by one or more processors, one or more applications on the emulator, wherein executing the one or more applications comprises:
      tracking, during execution of the one or more applications, a utilization by the one or more applications of each of the one or more hardware components, wherein the utilization comprises data reflecting an amount of time spent in each operating state of each of the one or more hardware components; and
      determining, for each of the one or more hardware components, a simulated amount of energy consumed during the execution of the one or more applications based on the utilization tracked during execution and based on the set of energy utilization specifications, wherein each simulated amount of energy comprises a product of an amount of time from an associated utilization and a corresponding energy consumption per time unit from an associated energy utilization specification; and
   outputting a usage of energy by the one or more applications during their execution based on the simulated amount of energy consumed by the one or more hardware components, wherein the outputting comprises displaying, in real-time, a report comprising the simulated amount of energy consumed by each of the one or more hardware components as the one or more applications execute.

2. The method of claim 1, wherein the one or more hardware components comprise:
   one or more processors, one or more memory devices, one or more storage devices, one or more cellular communication devices, one or more display devices, one or more cameras, one or more location detection devices, and one or more network communication devices.

3. The method of claim 1, wherein outputting the usage of energy by the one or more applications, comprises:
   outputting a report comprising an overall amount of energy consumed by each of the one or more hardware components during execution of the one or more applications.

4. A non-transitory computer readable storage medium comprising instructions for causing one or more processors to perform a method, comprising:

initiating an emulator configured to simulate operation of an operating system on a mobile computing device;

accessing a device profile for the mobile computing device, wherein the device profile specifies one or more hardware components of the mobile computing device that are simulated by the emulator, wherein the one or more hardware components specified in the device profile are received from a user of the emulator;

accessing a set of energy utilization specifications for the one or more hardware components, wherein each energy utilization specification in the set of energy utilization specifications specifies one or more operating states of one of the one or more hardware components, and an energy consumption of the one of the one or more hardware components per time unit for each of the one or more operating states of the one of the one or more hardware components during operations of the one of the one or more hardware components;

executing one or more applications on the emulator, wherein executing the one or more applications comprises:

tracking, during execution of the one or more applications, a utilization by the one or more applications of each of the one or more hardware components, wherein the utilization comprises data reflecting an amount of time spent in each operating state of each of the one or more hardware components; and determining, for each of the one or more hardware components, a simulated amount of energy consumed during the execution of the one or more applications based on the utilization tracked during execution and based on the set of energy utilization specifications, wherein each simulated amount of energy comprises a product of an amount of time from an associated utilization and a corresponding energy consumption per time unit from an associated energy utilization specification; and outputting a usage of energy by the one or more applications during their execution based on the simulated amount of energy consumed by the one or more hardware components, wherein the outputting comprises displaying, in real-time, a report comprising the simulated amount of energy consumed by each of the one or more hardware components as the one or more applications execute.

5. The non-transitory computer readable storage medium of claim 4, wherein the one or more hardware components comprise:

one or more processors, one or more memory devices, one or more storage devices, one or more cellular communication devices, one or more display devices, one or more cameras, one or more location detection devices, and one or more network communication devices.

6. The non-transitory computer readable storage medium of claim 4, wherein outputting the usage of energy by the one or more applications, comprises:

outputting a report comprising an overall amount of energy consumed by each of the one or more hardware components during execution of the one or more applications.

7. A system, comprising:

one or more memory devices storing instructions; and one or more processors coupled to the one or more memory devices and configured to execute the instructions to perform a method comprising:

initiating an emulator configured to simulate operation of an operating system on a mobile computing device;

accessing a device profile for the mobile computing device, wherein the device profile specifies one or more hardware components of the mobile computing device that are simulated by the emulator, wherein the one or more hardware components specified in the device profile are received from a user of the emulator;

accessing a set of energy utilization specifications for the one or more hardware components, wherein each energy utilization specification in the set of energy utilization specifications specifies one or more operating states of one of the one or more hardware components, and an energy consumption of the one of the one or more hardware components per time unit for each of the one or more operating states of the one of the one or more hardware components during operations of the one of the one or more hardware components;

executing one or more applications on the emulator, wherein executing the one or more applications comprises:

tracking, during execution of the one or more applications, a utilization by the one or more applications of each of the one or more hardware components, wherein the utilization comprises data reflecting an amount of time spent in each operating state of each of the one or more hardware components; and determining, for each of the one or more hardware components, a simulated amount of energy consumed during the execution of the one or more applications based on the utilization tracked during execution and based on the set of energy utilization specifications, wherein each simulated amount of energy comprises a product of an amount of time from an associated utilization and a corresponding energy consumption per time unit from an associated energy utilization specification; and outputting a usage of energy by the one or more applications during their execution based on the simulated amount of energy consumed by the one or more hardware components, wherein the outputting comprises displaying, in real-time, a report comprising the simulated amount of energy consumed by each of the one or more hardware components as the one or more applications execute.

8. The system of claim 7, wherein outputting the usage of energy by the one or more applications, comprises:

outputting a report comprising an overall amount of energy consumed by each of the one or more hardware components during execution of the one or more applications.

* * * * *